United States Patent [19]
Ikeda et al.

[11] Patent Number: 6,091,049
[45] Date of Patent: Jul. 18, 2000

[54] POWER SUPPLY APPARATUS FOR USE WITH ARC UTILIZING DEVICE

[75] Inventors: Tetsuro Ikeda, Osaka; Takeshi Morimoto, Kobe; Masayuki Ono, Toyonaka, all of Japan

[73] Assignee: Sansha Electric Manufacturing Company, Limited, Osaka, Japan

[21] Appl. No.: 09/344,286

[22] Filed: Jun. 30, 1999

[30] Foreign Application Priority Data

Jul. 8, 1998 [JP] Japan .................................. 10-192927

[51] Int. Cl.[7] .................................................. B23K 9/095
[52] U.S. Cl. .............................. 219/130.21; 219/130.32
[58] Field of Search ........................ 219/130.21, 130.31, 219/130.32, 130.33, 130.51, 137 PS

[56] References Cited

U.S. PATENT DOCUMENTS

| | | | |
|---|---|---|---|
| 4,503,316 | 3/1985 | Murase et al. ...................... | 219/130.32 |
| 4,564,742 | 1/1986 | Karlsson ............................. | 219/130.33 |
| 5,272,313 | 12/1993 | Karino et al. ...................... | 219/130.21 |
| 5,310,992 | 5/1994 | Karino et al. ...................... | 219/130.21 |
| 5,811,757 | 9/1998 | Higgins ............................... | 219/130.32 |

*Primary Examiner*—Clifford C. Shaw
*Attorney, Agent, or Firm*—Duane, Morris & Heckscher LLP

[57] ABSTRACT

A power supply apparatus for use with an arc utilizing device includes capacitors coupled in series between outputs of a rectifying unit, and inverters each of which is coupled across a respective one of the capacitors. Each inverter converts a DC voltage from the capacitor into a high frequency voltage and applies it to a respective one of transformers. A converter converts an output voltage from each transformer into a DC voltage for application to a load. An output detector generates a signal representative of an output current supplied to the load. A first voltage detector generates a signal representative of a first voltage to be applied to the inverters. A second voltage detector generates a signal representative of a second voltage across one of the capacitors. A voltage balancing unit generates control signals for determining the conduction periods of the respective inverters in accordance with the difference between the output representative signal and a preset desired-output-current representative signal. The voltage balancing unit modifies at least one of the control signals to change the conduction period of the inverter associated therewith in accordance with the difference between the first- and second-voltage representative signals.

6 Claims, 4 Drawing Sheets

POWER SUPPLY APPARATUS FOR USE WITH ARC UTILIZING DEVICE

This invention relates to a power supply apparatus for use with an arc utilizing device, such as an arc welder, an arc cutter, a plasma arc welder, and a plasma arc cutter, and, in particular, relates to such power supply apparatus which can compensate for variations in input voltage.

BACKGROUND OF THE INVENTION

A power supply apparatus for use with an arc utilizing device may include an inverter, for reduction of the size and weight of the apparatus. One of such power supply apparatuses includes a pair of inverters. An input AC voltage applied to the power supply apparatus is rectified by an input-side rectifier and smoothed by a capacitor into a DC voltage. The DC voltage is applied to the inverters, and converted into high frequency voltages. The high frequency voltages are voltage-transformed by a transformer and rectified by an output-side rectifier into a DC voltage for application to a load. By converting DC voltages into high frequency voltages, a small transformer can be used, whereby the power supply apparatus can be downsized as a whole.

When an input AC voltage to be applied to such power supply apparatus is high, e.g. 400V, the output voltage from the input-side rectifier, i.e. the input voltage to the inverters, is high (at $\sqrt{2}*400 \approx 565$ V). Thus, the inverters require control elements, for example, switching elements such as IGBTs, MOSFETs and bipolar transistors, which have a breakdown voltage of 1200V or so. Switching elements having a breakdown voltage of e.g. 1200V, however, are less commercially available than, and twice or more as expensive as control elements having a breakdown voltage of e.g. 600V. Furthermore, switching elements having a breakdown voltage of 600V can be used at a higher frequency than elements having a breakdown voltage of 1200V. Therefore, use of switching elements having a breakdown voltage of 600V or so can realize a more compact power supply apparatus.

U.S. Pat. No. 5,272,313 issued on Dec. 21, 1993, assigned to the same assignee as the present application, discloses a power supply apparatus for use with an arc utilizing device in which two inverters using switching elements having a breakdown voltage of 600V or so are coupled in series. Such power supply apparatus can operate from a high input voltage.

Figure 1:
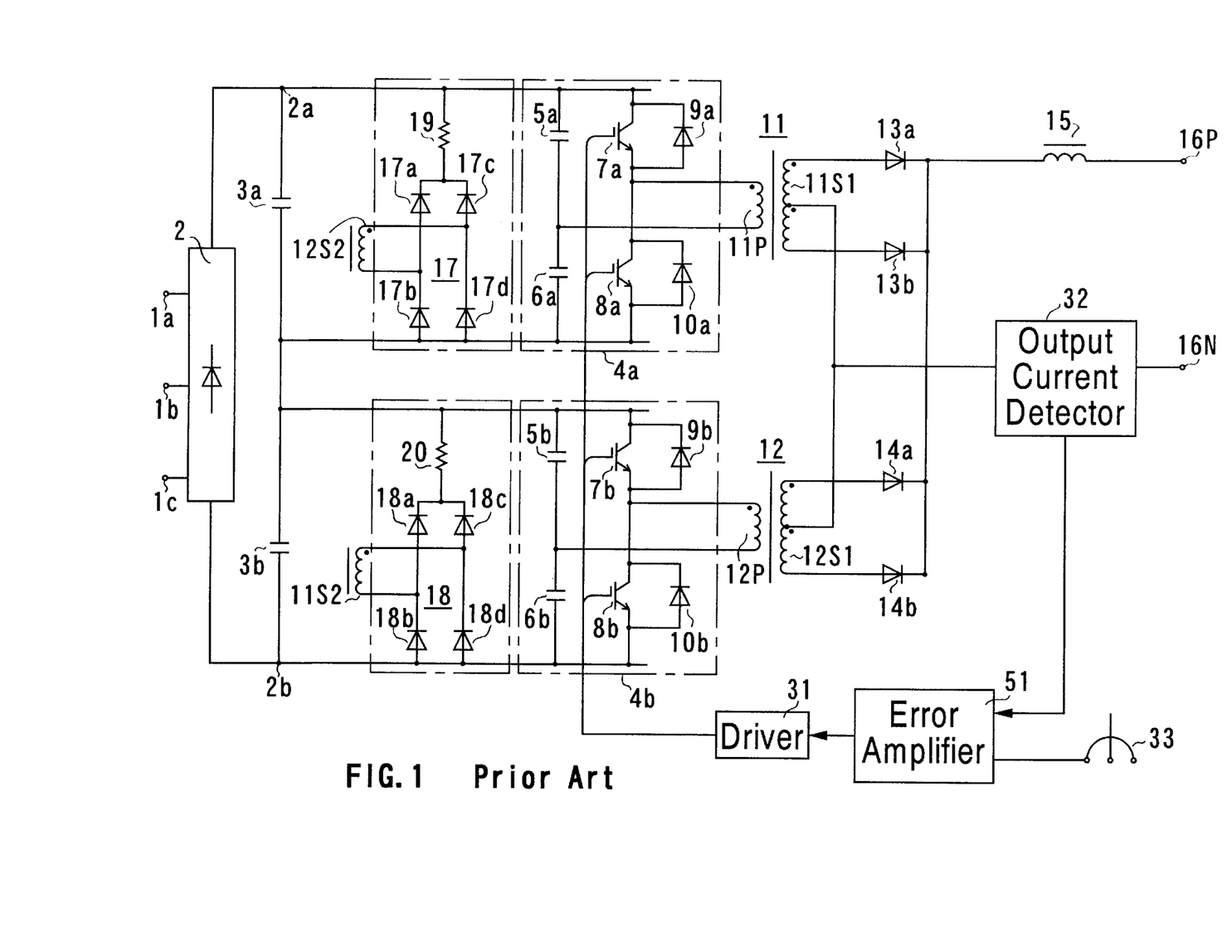
FIG. 1 is a block diagram of a prior art power supply apparatus for use with an arc utilizing device.

FIG. 1 shows a portion of the power supply apparatus disclosed in the aforementioned U.S. patent which is related to the present invention. In FIG. 1, a three-phase high commercial AC voltage of e.g. 400V is applied between input terminals 1a, 1b and 1c and rectified by an input-side rectifier 2. A pair of smoothing capacitors 3a and 3b are coupled in series between output terminals 2a and 2b of the rectifier 2. The voltage rectified by the input-side rectifier 2 is smoothed by the smoothing capacitors 3a and 3b, and converted into a DC voltage.

A DC voltage across the smoothing capacitor 3a is applied to an inverter, e.g. a half-bridge type inverter 4a. The inverter 4a has switching elements (e.g. IGBTs) 7a and 8a coupled in series. A series combination of capacitors 5a and 6a is coupled in parallel with the series-coupled switching elements 7a and 8a. A flywheel diode 9a is coupled in parallel with the emitter-collector conduction path of the switching element 7a, and a flywheel diode 10a is coupled in parallel with the emitter-collector conduction path of the switching element 8a.

Similarly, a DC voltage developed across the other smoothing capacitor 3b is applied to an inverter 4b. The inverter 4b also has switching elements (e.g. IGBTs) 7b and 8b coupled in series. A series combination of capacitors 5b and 6b is coupled in parallel with the series-coupled switching elements 7b and 8b. A flywheel diode 9b is coupled in parallel with the emitter-collector conduction path of the switching element 7b, and a flywheel diode 10b is coupled in parallel with the emitter-collector conduction path of the switching element 8b.

The switching elements 7a and 8a of the inverter 4a are alternately turned on and turned off (i.e. made conductive and non-conductive) in response to control signals, e.g. pulse drive signals, applied thereto from a switching element driving unit 31, to convert the received DC voltage into a high frequency voltage. The switching elements 7b and 8b of the inverter 4b operate in the same manner as the elements 7a and 8a.

The high frequency voltages from the inverters 4a and 4b are applied respectively to a primary winding 11P of a transformer 11 and a primary winding 12P of a transformer 12. The voltage-transformed high frequency voltages are induced in a secondary winding 11S1 of the transformer 11 and a secondary winding 12S2 of the transformer 12, respectively. The induced high frequency voltages are rectified by an output-side rectifier comprising rectifying diodes 13a, 13b, 14a and 14b, smoothed by a smoothing reactor 15, and applied through output terminals 16P and 16N to a load, e.g. a workpiece and a torch.

An output current detector 32 detects an output current supplied to the load. The output current detector 32 provides a signal representative of the detected output current to an error amplifier 51. The error amplifier 51 receives also a signal representative of a desired output current set through an output current setting unit 33. The error amplifier 51 determines the difference between the desired-output-current representative signal and the detected-output-current representative signal, and provides an error signal representative of the difference to the switching element driving unit 31. The switching element driving unit 31 determines a conduction period during which each of the switching elements 7a, 8a, 7b and 8b is turned on, such that the error signal is zero. The sum of the conduction period and a non-conduction period of each switching element is a predetermined constant value. In other words, the switching elements 7a, 8a, 7b and 8b are PWM controlled. The transformer 11 has a secondary winding 11S2 in addition to the secondary winding 11S1. A high frequency voltage induced in the secondary winding 11S2 is rectified by a full-wave rectifier 18 including diodes 18a–18d, and applied through a resistor 20 to the input of the inverter 4b.

Similarly, the transformer 12 has a secondary winding 12S2 in addition to the secondary winding 12S1. A high frequency voltage induced in the secondary winding 12S2 is rectified by a full-wave rectifier 17 including diodes 17a–17d, and applied through a resistor 19 to the input of the inverter 4a.

Thus, the output voltage of the inverter 4a is fed back through the secondary winding 11S2 of the transformer 11 to the input of the inverter 4b, and the output voltage of the inverter 4b is fed back through the secondary winding 12S2 of the transformer 12 to the input of the inverter 4a.

Such feedback of the output voltages of the inverters 4a and 4b can keep the voltages of the capacitors 3a and 3b equal regardless of the difference in capacitance or leak current between the capacitors 3a and 3b. Let it be assumed, for example, that the input voltage to the inverter 4a is higher than the one to the inverter 4b. Then, the voltage applied across the primary winding 11P of the transformer 11 is higher than the one across the primary winding 12P of the transformer 12. Therefore, the voltage induced in the secondary winding 11S2 of the transformer 11 becomes higher than the voltage induced in the secondary winding 12S2 of the transformer 12. The higher voltage induced across the secondary winding 11S2 is applied through the resistor 20 to the primary winding 12P of the transformer 12 supplied with the lower input voltage, whereas the lower voltage of the secondary winding 12S2 is applied to the primary winding 11P of the transformer 11 supplied with the higher input voltage. This can make equal the voltages applied across the primary winding 11P and the primary winding 12P.

In the power supply apparatus as stated above, it is desirable to promptly cancel the above-stated input voltage imbalance and make the voltages balanced. For that purpose, the resistors 19 and 20 should have a low resistance. The resistors 19 and 20 conduct a large current and should not be damaged by such large current. Such resistors are relatively large in size. Use of the large-sized resistors increases the size of the power supply apparatus, and offsets the advantage provided by the use of the inverters that can downsize the power supply apparatus.

An object of the present invention is to provide a power supply apparatus for use with an arc utilizing device which can provide balanced input voltages to inverters used therein and can still be compact in size.

SUMMARY OF THE INVENTION

A power supply apparatus for use with an arc utilizing device according to the present invention has an input-side rectifying unit which rectifies an AC voltage and develops an output voltage between two output terminals thereof. A pair of smoothing capacitors are coupled in series with each other between the two output terminals. A pair of inverters are coupled across respective ones of the smoothing capacitors. Each inverter has a switching element which is alternately turned on and off in response to a control signal, to thereby convert a DC voltage applied thereto from an associated one of the smoothing capacitors into a high frequency voltage. The high frequency voltages from the inverters are applied to a transformer. A converter converts an output voltage from the transformer into a DC voltage, which is applied to a load. An output detector generates a signal representative of an output, e.g. an output current, an output voltage or an output power, supplied from the converter to the load. A first voltage detector is coupled between the series combination of the smoothing capacitors for generating a first-voltage representative signal representative of a first voltage to be applied to each of the inverters. A second voltage detector is coupled across one of the smoothing capacitors for generating a second-voltage representative signal representative of a second voltage developed across the one capacitor. The output representative signal and the first- and second-voltage representative signals are applied to a control unit. The control unit generates control signals in accordance with the difference between the output representative signal and a predetermined signal. The control signals determine the conduction periods of the switching elements of the inverters. The control signals are applied to the inverters, so that the power supply apparatus can provide the load with an output corresponding to the predetermined signal.

The control unit modifies the control signal to be applied to at least one of the inverters in accordance with the difference between the first- and second-voltage representative signals. The at least one of the inverters is controlled such that the switching element thereof has a conduction period modified in accordance with the modified control signal.

For example, if the second voltage is higher than the first voltage, the conduction period of the switching element of the inverter across which the second voltage is detected is increased, or, alternatively, the conduction period of the switching element of the other inverter is reduced. If the second voltage is lower than the first voltage, the conduction period of the switching element of the inverter across which the second voltage is detected is reduced, or, alternatively, the conduction period of the switching element of the other inverter is increased.

Such operation keeps the input voltages of the two inverters balanced.

The modification may be made to both of the control signals to be applied to the respective inverters. In this case, the conduction period of the switching element of one inverter is increased, when the conduction period of the switching element of the other inverter is reduced.

Specifically, when the second-voltage representative signal is greater than the first-voltage representative signal, the conduction period of the switching element of the inverter across which the second voltage detector is coupled is increased, and the conduction period of the switching element of the other inverter is reduced.

When the second-voltage representative signal is smaller than the first-voltage representative signal, the conduction period of the switching element of the inverter across which the second voltage detector is coupled is reduced, and the conduction period of the switching element of the other inverter is increased.

By controlling the conduction periods of both inverters together as stated above, the first and second voltages can be rapidly made balanced.

The conduction periods can be modified by the entire time length corresponding to the difference between the first and second voltages, at a time. By such modification, however, the second voltage, for example, when it is higher than the first voltage, may abruptly drop to a lower value than the first voltage. To prevent such abrupt voltage drop, the conduction period modification may be made by a predetermined shorter time length at a time. The conduction period modification can be made in various ways.

Each of the inverters may include at least two switching elements. The inverter with at least two switching elements alternates between a first state in which one switching element is conductive and the other is non-conductive and a second state in which the one switching element is non-conductive and the other is conductive. To prevent the two switching elements from being conductive together, a quiescent interval during which the two switching elements are non-conductive is provided. The conduction period modification does not cause the conduction periods of the switching elements to extend into the quiescent interval.

BRIEF DESCRIPTION OF THE DRAWINGS

FIG. 4(b) shows a waveform of a basic pulse signal generated by the voltage balancing unit of FIG. 3, FIGS. 4(c)–4(g) show waveforms of modified pulse signals generated by the voltage balancing unit of FIG. 3, and FIG. 4(h) shows a waveform of an effective modified pulse signal generated by the voltage balancing unit of FIG. 3;

DETAILED DESCRIPTION OF PREFERRED EMBODIMENT

Figure 2:
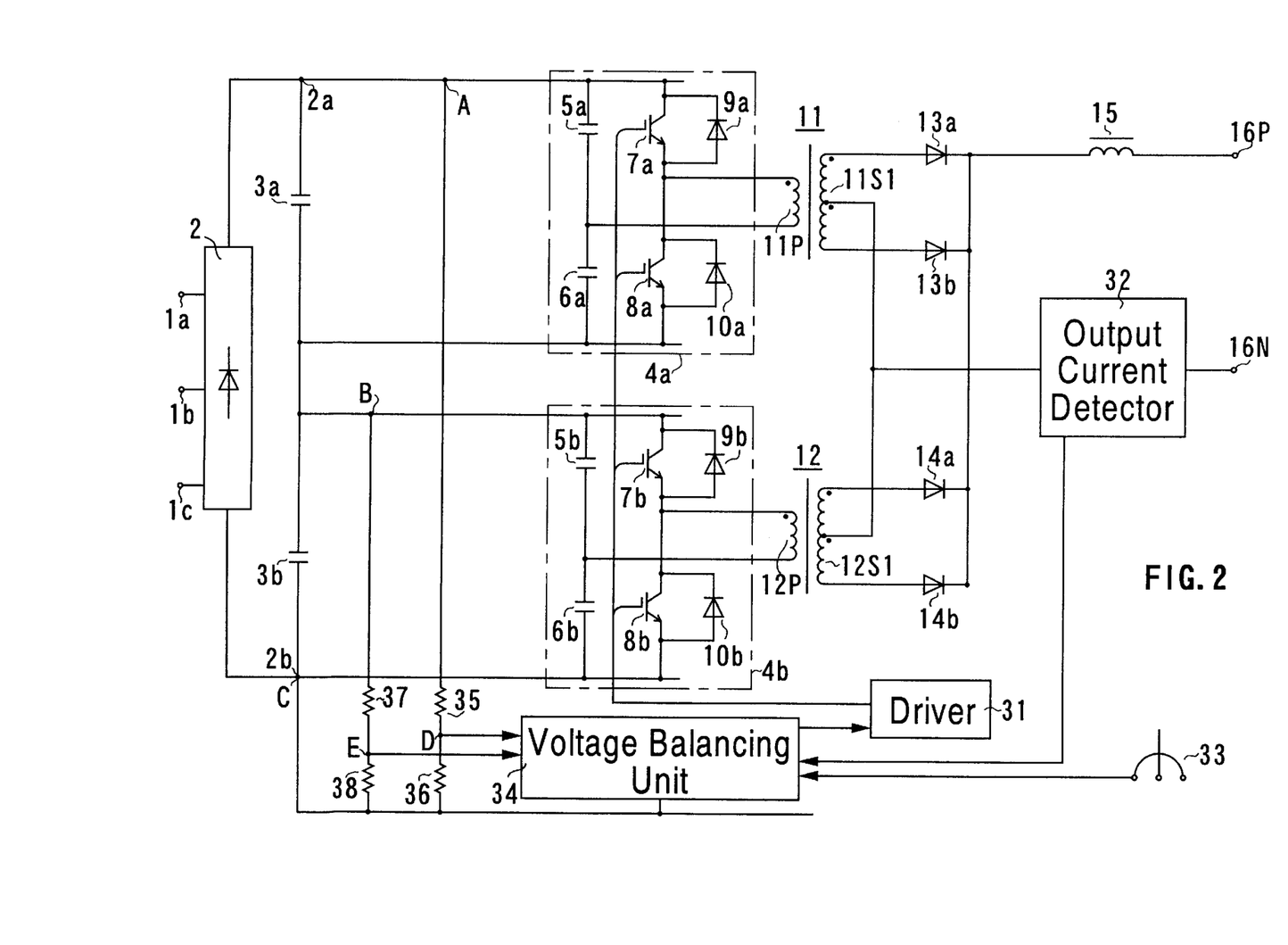
FIG. 2 is a block diagram of a power supply apparatus for use with an arc utilizing device according to one embodiment of the present invention.

A power supply apparatus for use with an arc utilizing device according to one embodiment of the present invention is described below, with reference to FIGS. 2–6. As is seen from the comparison of FIG. 2 with FIG. 1, the power supply apparatus according to the present invention does not have the secondary windings 11S2 and 12S2 of the transformers 11 and 12, respectively, the diodes 17a–17d and 18a–18d, the resistors 19 and 20, and the error amplifier 51, all of which are included in the prior art power supply apparatus shown in FIG. 1. Instead, the power supply apparatus shown in FIG. 2 has a voltage balancing unit 34 as a part of a control unit. In FIG. 2, the same reference numerals as used in FIG. 1 denote similar components and functions, of which descriptions are omitted.

The voltage balancing unit 34 receives, from a first voltage detector, a signal representative of a first voltage to be applied to each of the inverters 4a and 4b. The first voltage detector includes resistors 35 and 36 coupled in series between nodes A and C, which are coupled to the respective ends of the series combination of the capacitors 3a and 3b. The resistors 35 and 36 have the same resistance value. The voltage across the resistor 36, i.e. the voltage at a node D which is at the junction of the resistors 35 and 36, is applied to the voltage balancing unit 34 as the first-voltage representative signal. Since the resistors 35 and 36 have the same resistance value, the voltage across the resistor 36, i.e. the first-voltage representative signal, represents a balancing voltage to be applied to the inverters 4a and 4b when input voltages to the inverters 4a and 4b are in a balanced state.

The voltage balancing unit 34 also receives a second-voltage representative signal from a second voltage detector. The second voltage detector includes resistors 37 and 38 coupled in series across one of the capacitors, e.g. the capacitor 3b, i.e. between a node B which is at the junction of the capacitors 3a and 3b and the node C. The voltage across the resistor 38, i.e. the voltage at a node E which is at the junction of the resistors 37 and 38, is applied to the voltage balancing unit 34 as the second-voltage representative signal. The resistor 38 has a significantly higher resistance than the resistor 37. Therefore, the second-voltage representative signal substantially represents the voltage across the capacitor 3b.

Furthermore, the voltage balancing unit 34 receives a detected-output-current representative signal from an output current detector 32 and a desired-output-current representative signal from an output current setting unit 33.

Figure 3:
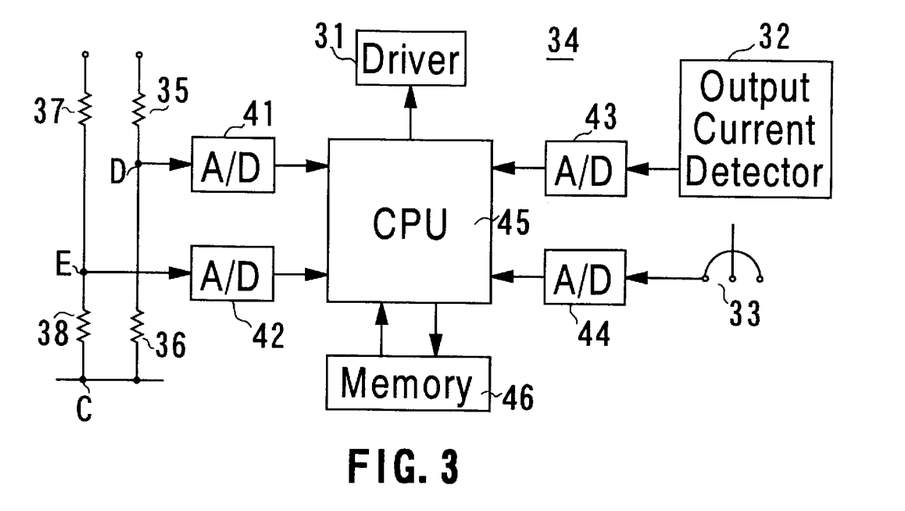
FIG. 3 is a block diagram of a voltage balancing unit of the power supply apparatus of FIG. 2.
Figure 4A:
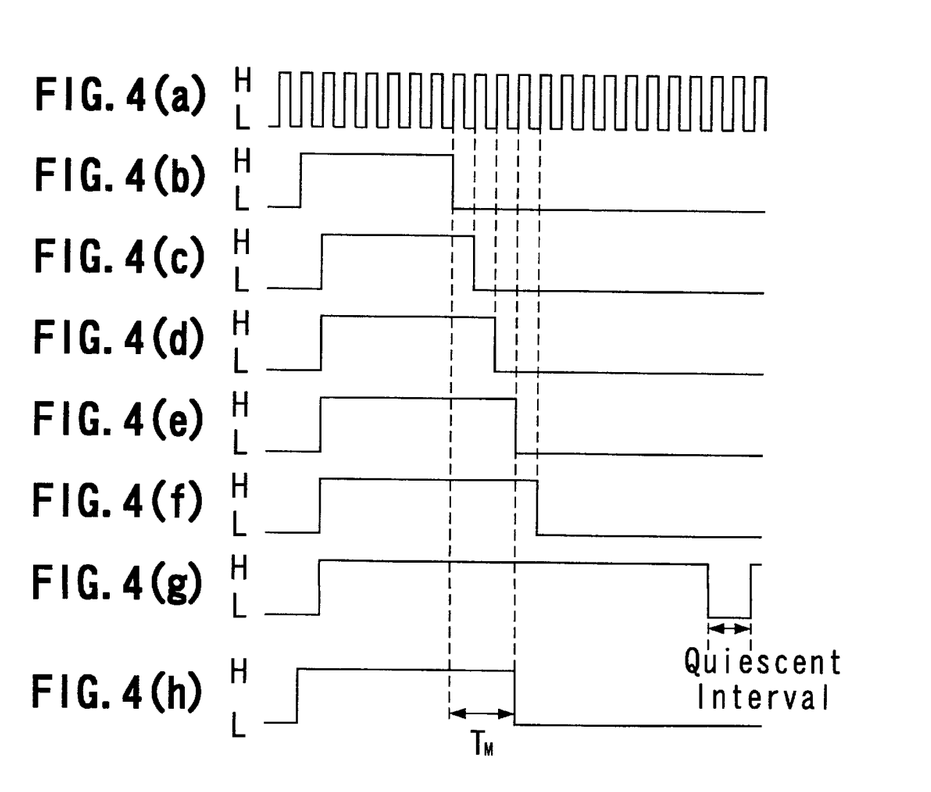
FIG. 4(a) shows a waveform of a clock pulse signal.

As shown in FIG. 3, the voltage balancing unit 34 includes a CPU 45. The CPU 45 receives digitized versions of the first- and second-voltage representative signals, the detected-output-current representative signal and the desired-output-current representative signal from A/D converters 41, 42, 43 and 44, respectively. The CPU 45 operates in accordance with the a program stored in a memory 46, and on a clock pulse signal as shown in FIG. 4(a).

The CPU 45 generates a basic pulse signal shown in FIG. 4(b) in accordance with the detected-output-current representative signal and the desired-output-current representative signal. The basic pulse signal, in its first state in which it is at e.g. a high level (H-level), represents the conduction period of each of the switching elements 7a, 7b, 8a and 8b, which tends to make zero the difference between the detected-output-current representative signal and the desired-output-current representative signal. The width of the basic pulse signal in its first state can be increased or reduced within a predetermined maximum admissible range in accordance with the difference between the detected-output-current representative signal and the desired-output-current representative signal.

The CPU 45 modifies the basic pulse signal in accordance with the first- and second-voltage representative signals, and generates one of modified pulse signals as shown in FIGS. 4(c)–4(f).

When the difference between the voltage at the node D, i.e. the first-voltage representative signal, and the voltage at the node E, i. e. the second-voltage representative signal is equal to or greater than, for example, 10V and smaller than 20V, the CPU 45 generates the modified pulse signal shown in FIG. 4(c), of which the falling edge occurs later by one clock period than the basic pulse signal.

When the difference between the first- and second-voltage representative signals is equal to or greater than, for example, 20V and smaller than 40V, the CPU 45 generates the modified pulse signal shown in FIG. 4(d), of which the falling edge occurs two clock periods later than the basic pulse signal.

When the difference between the first- and second-voltage representative signals is equal to or greater than, for example, 40V and smaller than 60V, the CPU 45 generates the modified pulse signal shown in FIG. 4(e), of which the falling edge occurs three clock periods later than the basic pulse signal.

When the difference between the first- and second-voltage representative signals is equal to or greater than, for example, 60V and smaller than 100V, the CPU 45 generates the modified pulse signal shown in FIG. 4(f) of which the falling edge occurs four clock periods later than the basic pulse signal.

When the difference between the first- and second-voltage representative signals is smaller than 10V, the CPU 45 generates no modified pulse signal. In other words, the modified pulse signal is generated only when the difference between the first- and second-voltage representative signals is equal to or greater than 10V. Thus, the threshold voltage is at 10V.

When the difference between the first- and second-voltage representative signals is equal to or greater than 100V, the CPU 45 assumes that the balance between the voltages is abnormal, and generates a modified pulse signal of which the falling edge occurs at the latest time point in the maximum admissible range for the conduction period of the switching elements 7a, 7b, 8a and 8b, as shown in FIG. 4(g). Assuming that the switching elements 7a and 7b, for example, are controlled by the modified pulse signal shown in FIG. 4(g), one switching element, e.g. the switching element 7a, is made alternately conductive over the maximum admissible range, and non-conductive during a quiescent interval, whereas the other switching element, e.g. the switching element 7b, is kept non-conductive.

The difference voltage ranges exemplified above are for an input AC voltage having an effective value of e.g. 400V. Needless to say, the voltage ranges corresponding respectively to the modified pulse signals may be changed when an AC voltage having a different effective value is applied.

As is seen from the comparison of FIG. 4(b) with FIGS. 4(c)–4(g), the rising edge of each modified pulse signal occurs one clock period later than that of the basic pulse signal. This is because the CPU 45 is arranged to generate the modified pulse signal only after knowing the generation of the basic pulse signal. Since the rising edge of the modified pulse signal does not coincide with that of the basic pulse signal, the inverters 4a and 4b become conductive at slightly different times. To compensate for such slight difference, the basic pulse signal and each of the modified pulse signals are ORed to provide an effective modified pulse signal which is equivalent to that modified pulse signal except that the rising edge is modified to coincide with that of the basic pulse signal, like the one shown in FIG. 4(h). The effective modified signal having a modified rising edge is actually used. The signal shown in FIG. 4(h) corresponds to the modified pulse signal shown in FIG. 4(e).

The above descriptions hold when the first-voltage representative signal is greater than the second-voltage representative signal. If the second-voltage representative signal is greater than the first-voltage representative signal, the CPU 45 generates modified pulse signals having a pulse width smaller than the basic pulse signal.

When the second-voltage representative signal is greater than the first-voltage representative signal with the difference therebetween being equal to or greater than 10V and smaller than 20V, the CPU 45 generates a modified pulse signal of which the falling edge occurs earlier by one clock period than the basic pulse signal.

When the second-voltage representative signal is greater than the first-voltage representative signal with the difference therebetween being equal to or greater than 20V and smaller than 40V, the CPU 45 generates a modified pulse signal of which the falling edge occurs two clock periods earlier than the basic pulse signal.

When the second-voltage representative signal is greater than the first-voltage representative signal with the difference therebetween being equal to or greater than 40V and smaller than 60V, the CPU 45 generates a modified pulse signal of which the falling edge occurs three clock periods earlier than the basic pulse signal.

When the second-voltage representative signal is greater than the first-voltage representative signal with the difference therebetween being equal to or greater than 60V and smaller than 100V, the CPU 45 generates a modified pulse signal of which the falling edge occurs four clock periods earlier than the basic pulse signal.

The basic pulse signal and the effective modified pulse signal generated in the manner described above are applied to a switching element driving unit 31 which, together with the voltage balancing unit 34, constitutes the control unit. The switching element driving unit 31 generates two control signals for controlling the conduction periods of the switching elements 7b and 8b of the inverter 4b in accordance with the basic pulse signal, and generates two control signals for controlling the conduction periods of the switching elements 7a and 8a of the inverter 4a in accordance with the effective modified pulse signal.

When the modified pulse signal is not generated, the switching element driving unit 31 generates two control signals for respectively controlling the switching elements 7a and 8a of the inverter 4a in accordance with the basic pulse signal.

The two control signals for the inverter 4a have a first state corresponding to e.g. H-level and a second state corresponding to e.g. L-level. The period during which each of the control signal is in the first state represents the conduction period of an associated one of the switching elements 7a and 8a. When the control signal for the switching element 7a of the inverter 4a is in the first state, the control signal for the switching element 8a is in the second state. When the control signal for the switching element 7a is in the second state, the control signal for the switching element 8a is in the first state. This applies to the control signals for the inverter 4b, too.

Figure 5A:
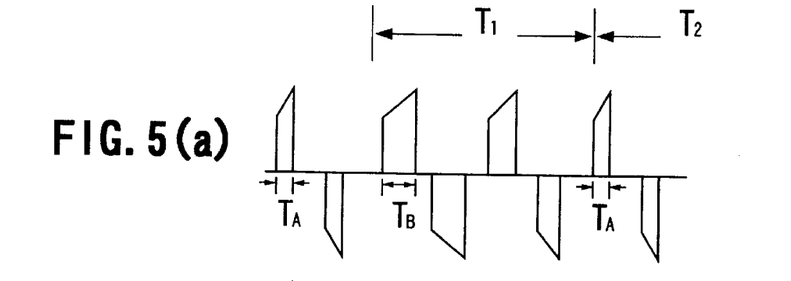
FIGS. 5(a) and 5(b) show how, in one example, the inverters 4a and 4b of the power supply apparatus of FIG. 2 are respectively controlled.
Figures 5B, 5C:
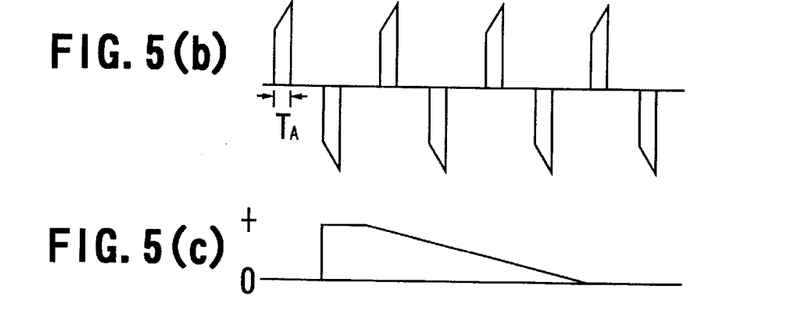
FIG. 5(c) shows a change of the difference in voltage between the capacitors 3a and 3b under such control of the inverters.

For example, when the first-voltage representative signal is greater than the second-voltage representative signal, the input voltage applied to the inverter 4a is higher than that applied to the inverter 4b. If the difference is equal to or greater than 40V and smaller than 60V, the effective modified pulse signal having a longer pulse width than the basic pulse signal by an amount TM (equal to three clock periods as shown in FIG. 4(h)) is applied to the switching element driving unit 31. In accordance with this effective modified pulse signal, the switching element driving unit 31 generates the control signals for controlling the switching elements 7a and 8a of the inverter 4a to have a conduction period $T_B$ which is longer than a normal conduction period $T_A$ determined by the basic pulse signal, as in a period $T_1$ shown in FIG. 5(a). The switching element driving unit 31 also generates, in accordance with the basic pulse signal, control signals for controlling the the switching elements 7b and 8b of the inverter 4b to have a conduction period equal to the normal conduction period $T_A$, as shown in FIG. 5(b).

This causes the inverter 4a having a higher input voltage applied thereto to bear more load than the inverter 4b. The capacitor 3a is discharged and the voltage thereof is decreased. FIG. 5(c) shows the difference in voltage between the capacitors 3a and 3b. The difference decreases as the capacitor 3a discharges.

When the discharge of the capacitor 3a reduces the difference between the greater, first-voltage representative signal and the smaller, second-voltage representative signal to a value equal to or greater than 20V and smaller than 40V, the effective modified pulse signal having a shorter pulse width results. In other words, the effective modified pulse signal having a width two clock periods longer than that of the basic pulse signal is applied to the switching element driving unit 31. As the capacitor 3a is further discharged, the difference decreases to a value equal to or greater than 10V and smaller than 20V. Then, the effective modified pulse signal has a width longer by one clock period than that of the basic pulse signal. As the capacitor 3a further discharges, the difference becomes smaller than 10V, which means that the capacitors 3a and 3b have almost equal voltages, so that the inverter 4a has a conduction period equal to the conduction period $T_A$ of the basic pulse signal as in a period $T_2$ shown in FIG. 5(a).

When the second-voltage representative signal is greater than the first-voltage representative signal, the inverter 4b has a higher input voltage than the inverter 4a. In this case, the conduction periods of the switching elements 7b and 8b of the inverter 4b are determined in accordance with the basic pulse signal, and the conduction periods of the switching elements 7a and 8a of the inverter 4a are shorter than the period determined in accordance with the basic pulse signal. Similar to the above-described operation, the conduction periods of the switching elements of the inverter 4a increase as the difference between the first- and second-voltage representative signals becomes smaller, so that the conduction periods approach the period determined in accordance with the basic pulse signal.

In the power supply apparatus according to the above-described embodiment of the present invention, the conduction periods of the switching elements 7a and 8a of the inverter 4a are controlled in accordance with the difference between the first- and second-voltage representative signals. But, the conduction periods of the switching elements 7b and 8b of the inverter 4b may be controlled instead of the switching elements 7a and 8a. In this case, the conduction periods of the switching elements 7a and 8a of the inverter 4a are controlled in accordance with the basic pulse signal. Therefore, when the first-voltage representative signal is greater than the second-voltage representative signal, the conduction periods of the switching elements 7b and 8b of the inverter 4b are reduced in accordance with the effective modified pulse signal. When the first-voltage representative signal is smaller than the second-voltage representative signal, the conduction periods of the switching elements 7b and 8b of the inverter 4b are increased in accordance with the effective modified pulse signal. As the difference between the first- and second-voltage representative signals becomes smaller, the conduction periods of the switching elements 7b and 8b of the inverter 4b approach the period determined by the basic pulse signal.

Figure 6A:
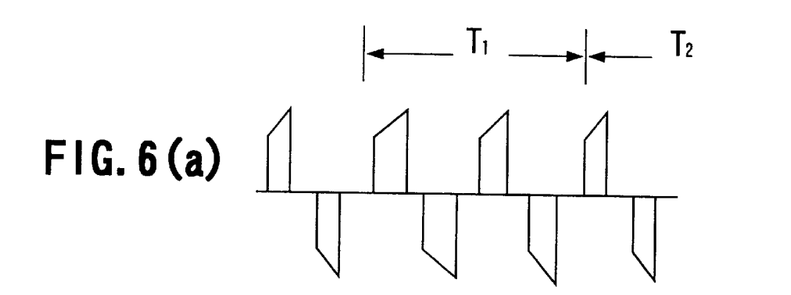
FIGS. 6(a) and 6(b) show how, in another example, the inverters 4a and 4b of the power supply apparatus of FIG. 2 are respectively controlled.
Figure 6B:
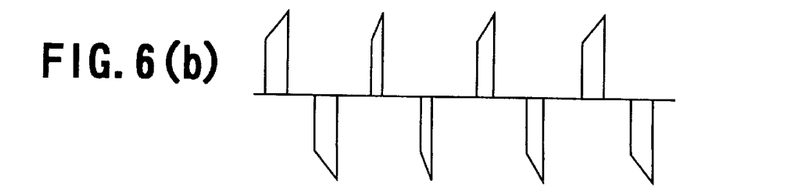
Figure 6C:
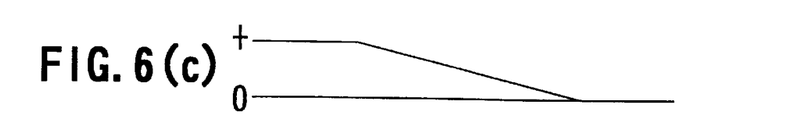
FIG. 6(c) shows a change of the difference in voltage between the capacitors 3a and 3b under such control of the inverters.

In the power supply apparatus according to the above-described embodiment, the conduction periods of the switching elements of one inverter only are controlled. But, the conduction periods of the switching elements of both inverters may be controlled together. For example, when the first-voltage representative signal is greater than the second-voltage representative signal, the conduction periods of the switching elements 7a and 8a of the inverter 4a may be increased as in a period $T_1$ shown in FIG. 6(a) in accordance with the effective modified pulse signal, while the conduction periods of the switching elements 7b and 8b of the inverter 4b may be reduced as in the period $T_1$ shown in FIG. 6(b). In this case, too, the amount of increase of the conduction period of each switching element of the inverter 4a and the amount of decrease of the conduction period of each switching element of the inverter 4b become smaller as the voltage of the capacitor 3a decreases. When the capacitors 3a and 3b have equal voltages, the conduction periods of the switching elements of the two inverters 4a and 4b become equal to the period determined by the basic pulse signal as in a period $T_2$ shown in FIGS. 6(a) and 6(b).

When the second-voltage representative signal is greater than the first-voltage representative signal, the conduction periods of the switching elements 7a and 8a of the inverter 4a are reduced and the conduction periods of the switching elements 7b ad 8b of the inverter 4b are increased. As the difference between the second- and first-voltage representative signals becomes smaller, the conduction periods of the switching elements 7a and 8a of the inverter 4a are made longer and the conduction periods of the switching elements 7b and 8b of the inverter 4b are made shorter. When the capacitors 3a and 3b have equal voltages, the conduction periods of the switching elements of the inverters 4a and 4b are equal to the period determined by the basic pulse signal.

The voltage balancing unit 34 may comprise components such as a comparator and counters, instead of the CPU 45.

In the power supply apparatus according to the above-described embodiment, IGBTs are used as the switching elements of the inverters 4a and 4b. But, the IGBTs may be replaced by FETs or bipolar transistors.

In the power supply apparatus according to the above-described embodiment, the inverters 4a and 4b are of a half-bridge type, but they may be of a full-bridge type.

The power supply apparatus according to the above-described embodiment is constant-current controlled in which the inverters 4a and 4b are controlled in accordance with the detected output current. But, the apparatus may be constant-voltage or constant-power controlled by detecting an output voltage or output power to the load.

The power supply apparatus according to the above-described embodiment includes separate transformers as the transformers 11 and 12. Instead, coils for the transformer 11 and the transformer 12 may be wound around separate legs of a single core.

In the power supply apparatus according to the above-described embodiment, the rising edge of the effective modified pulse signal coincides with the rising edge of the basic pulse signal. In some cases, however, the rising edges do not have to coincide with each other.

What is claimed is:

1. A power supply apparatus for use with an arc utilizing device, comprising:

an input-side rectifier for rectifying an AC voltage and developing a rectified voltage between two output terminals thereof;

a pair of smoothing capacitors coupled in series between the two output terminals of said input-side rectifier;

a pair of inverters, each of which is coupled across a respective one of the smoothing capacitors, each inverter being alternately rendered conductive and non-conductive in response to a control signal applied thereto, each inverter comprising a switching element for converting a DC voltage applied from the associated one of the smoothing capacitors into a high frequency voltage;

a transformer receiving the high frequency voltage from each of the inverters;

a converter for converting an output voltage from the transformer into a DC voltage for application to a load;

an output detector for generating a signal representative of an output to be applied from the converter to the load;

a first voltage detector coupled across the series combination of the smoothing capacitors for generating a signal representative of a first voltage to be applied to the inverters;

a second voltage detector coupled across one of the smoothing capacitors, and, hence, one of the inverters, for generating a signal representative of a second voltage across the one smoothing capacitor; and a control unit receiving said output representative signal and said first- and second-voltage representative signals, and generating control signals for determining conduction periods of the switching elements of the inverters in accordance with the difference between the output representative signal and a predetermined signal, at least one of the control signals being modified in accordance with the difference between the first- and second-voltage representative signals, said control unit controlling one of the inverters in accordance with the modified control signal.

2. The power supply apparatus according to claim 1 wherein the control unit modifies the said at least one control signal so that the conduction period of the switching element associated therewith is increased when the difference between the first- and second-voltage representative signals is greater than a predetermined threshold.

3. The power supply apparatus according to claim 1 wherein the control unit modifies the said at least one control signal so that the conduction period of the switching element associated therewith is reduced when the difference between the first- and second-voltage representative signals is greater than a predetermined threshold.

4. The power supply apparatus according to claim 1 wherein the control unit increases the conduction period of the switching element of the inverter across which the second voltage detector is coupled and reduces the conduction period of the switching element of the other inverter when the difference between the first- and second-voltage representative signals is greater than a predetermined threshold.

5. The power supply apparatus according to claim 1 wherein the modification of the control signals is such that the conduction periods of the switching elements are changed by a predetermined amount.

6. The power supply apparatus according to claim 1 wherein each of the inverters comprises at least two switching elements, the switching elements of each inverter being alternately rendered conductive and non-conductive in a complementary manner to each other, each control signal being modified in such a manner that the conduction period of each switching element is changed within a maximum admissible range of the switching elements.

* * * * *